United States Patent [19]

Adams

[11] 4,242,299

[45] Dec. 30, 1980

[54] APPARATUS AND METHOD FOR REMOVING CORE MARK MATERIAL FROM MOLDED CONCRETE BLOCKS

[76] Inventor: Roderick D. Adams, 1207 Welcome Cir., Durham, N.C. 27705

[21] Appl. No.: 56,354

[22] Filed: Jul. 10, 1979

[51] Int. Cl.[3] ........................ B29C 17/08; B29C 17/12

[52] U.S. Cl. .................................... 264/504; 264/161; 264/162; 264/536; 425/146; 425/162; 425/165

[58] Field of Search ............... 264/138, 161, 162, 163, 264/504, 536, 40.1, 40.7; 425/289, 295, 291, 296, 292, 312, 315, 304, 294, 135, 140, 146, 162, 164, 165, 404

[56] References Cited

U.S. PATENT DOCUMENTS

| | | | |
|---|---|---|---|
| 3,392,217 | 7/1968 | Zitzloff | 264/161 |
| 3,821,347 | 6/1974 | Katoh | 264/162 |
| 4,108,933 | 8/1978 | Goransson | 264/504 |
| 4,109,635 | 8/1978 | Rossborough | 264/162 |

*Primary Examiner*—Donald J. Arnold

[57] ABSTRACT

An apparatus and method utilizing pressurized air discharged through positionable outlets is adapted to blowing core mark material from freshly molded, uncured concrete blocks of either the rib or flute type designed to be split or conventional unsplit blocks so as to prevent the core mark material associated with such blocks from being trapped and hardening in recesses or on surfaces of the blocks.

12 Claims, 9 Drawing Figures

APPARATUS AND METHOD FOR REMOVING CORE MARK MATERIAL FROM MOLDED CONCRETE BLOCKS

BACKGROUND OF THE INVENTION

1. Field of the Invention

This invention relates to molding of concrete blocks and more especially to apparatus and methods for removing extraneous core mark material from molded concrete blocks.

2. Description of the Prior Art:

A popular type of concrete block is made with one or more core bars which form holes between two or more sections which are split apart after the block is cured to present a rough, cut stone surface appearance and vertical recesses, e.g., ribs or flutes, between areas of rough, split surface. Conventional concrete block units which are not split apart are also made by use of core bars. The core bar conventionally leaves what is called a core mark on the block immediately after molding as the block is withdrawn from the mold.

The core mark may be thought of as a ridge of concrete occurring on the top surface of a concrete masonary unit. The core mark occurs in the center of the web and the web may be thought of as being that portion of a concrete block which connects one face shell to the other and comprises a solid portion of the block between the hollow cores or openings in the block. The core mark in one operation in which the invention has been applied has been measured and has been found to be approximately 5/16 inch wide and $\frac{3}{8}$ inch high for substantially the entire length of the block. Core mark material has also been observed as consisting of unpacked concrete which occurs under the bar which holds the cups or cylinders in place during the molding process. These cups or cylinders create the holes or hollow portions of the block.

Some concrete block units are split after being formed while other concrete block units are not designed to be split. A conventional block may be considered as a concrete masonary unit which is not to be split down the center line of the core and in the area where the core mark occurs. The split rib or splt flute-type block may be considered as a concrete masonary unit which after manufacture and curing is split along the center line of the unit and in line with the core mark. Such units are molded in siamese fashion and are later divided by the splitting process. Thus, they are spoken of in the trade as siamese units.

The splitting of a split rib or split flute-type block is accomplished by two vertically aligned blades moving simultaneously into the unit. One blade moves vertically upwardly into the bottom of the block and a second blade moves vertically downwardly into the top of the block. The blades operate in common vertical plane and are in a straight line over and under the center of the cores. The top blade splits through the rib or flute area and therefore splits through the core mark area associated with the rib or flute area. It is therefore necessary that the core mark be removed from the rib or flute area of siamese units. If the core marks are left in their original position in the rib or flute area of siamese units the top splitting blade will be caused to shift off center in the splitting operation and will thereby create two split units of uneven dimensions. It should also be remembered that siamese blocks also have conventional core marks associated with openings through which no splitting occurs.

It has been the practice to remove the conventional core mark not only because it was unsightly but primarily because the presence of such core mark created a difficult leveling situation when the mason attempted to lay the masonary unit in the wall. In the past this core mark was removed from the masonary unit while in a "green" or uncured state by a fiber brush arranged to sweep along the top surface of the block as the block was moved on a conveyor away from the molding machine. Another practice in the trade has been to remove the core mark by employing a tensioned steel wire placed across the path of the block and at a height which avoids scraping the block but is sufficiently close to the top surface of the block to clip the core mark as the block moves beneath the wire and away from the block molding machine on the conveyor.

The two kinds of apparatus and methods described above have proven to be generally satisfactory for removing core marks on conventional-type blocks. However, if the concrete masonary units are made in siamese for the purpose of splitting along the center line of the rib or flute associated core openings, it has been found necessary that the core marks be removed by an apparatus and method other than those which have been described. It is particularly necessary to remove such core mark material from siamese-type masonary units where the core holes associated with the ribs or flutes are small in size and thereby create a small slot between the ribs or flutes formed after splitting. If the core marks associated with siamese-type masonry units are removed from the rib or flute portion of the siamese units by either of the described prior art apparatus and methods, the loose, granulated concrete material resulting from the removal process tends to fall and lodge in the small openings associated with the rib or flute portions of the block and thus become an integral part of the masonry unit where the material happens to fall. Such extraneous material creates an irregular and unsightly situation when these siamese masonry units are later split. The importance of this undesirable situation to the trade can be appreciated by observing that the flutes or ribs of siamese units ultimately become decorative facings of buildings which employ the specialty siamese-types of masonry units. Thus, the presence of such extraneous core mark material in the rib or flute portions of siamese concrete block units have been of considerable concern to owners of buildings as well as to architects and to masonry contractors. Architects, for example, are beginning to insist on split masonry units being free of granulated concrete lodged between the ribs and flutes.

In order to deliver "clean" rib or flute siamese units, the more quality conscious concrete block manufacturers have in the past used a sharp, hoe-type rake to scrape the core marks from the rib or flute portions of the siamese units after such masonry units have been cured and split. Cured granulated concrete will not lodge in the small openings. However, the use of such scraping apparatus and method requires the use of an additional employee and has not proven to be entirely satisfactory in obtaining the desired clean appearance in the finished product.

Thus, it would be desirable to have an apparatus and method for removing core mark material from both conventional as well as siamese-type masonry units without involving manual labor and in a manner designed to prevent the core mark material from being cured and hardening on the block surfaces or between the ribs or flutes in the case of split siamese units. It would also be desirable in the case of split blocks to eliminate the unsightly appearance associated with hardened core mark material in the rib or flute areas and to eliminate the need for additional manual labor to remove such material once it has been cured and has hardened. It would also not only be desirable to have an apparatus and method for removing core mark material from both conventional as well as siamese masonry units but it would also be desirable to have such an apparatus and method which, with minor adjustment, could be employed for removing such core mark material from any of the numerous sizes and forms of conventional and siamese masonry units as found in the trade.

SUMMARY OF THE INVENTION

The apparatus and method of the invention utilize one or more positionable air conduits and switch-controlled pressurized air source connected to the conduits so as to establish one or more air streams aimed at removing the core mark material immediately after the block has been molded and before it is cured. The molded block is typically carried by conveyor on a pallet from the molding station. The invention provides an electric switch which is tripped by the pallet as the conveyor moves the pallet and the block on the pallet through a second station along the conveyor at which the core mark material is removed. At this second station, the pallet trips an electric limit switch which in turn controls an electrically operated air valve. The air valve when opened, pressurizes an air manifold, which, in turn pressurizes one or more of the adjustably positioned air conduits which are directed to remove one or more rows of core mark material from the top surface of the block. The air streams established by the conduits are aimed in such a manner and synchronized with movement of the freshly molded, uncured block so as to blow the core mark material away from the holes formed by the core bar and either completely from the top surface of the block or into larger holes through which the material can fall. In any event, the one or more rows of core mark material along split lines of a siamese masonry unit is prevented from entering the normally, relatively small, core bar holes along the line on which the blocks are to be split after being cured. Thus, extraneous core mark material is prevented from being trapped in the rib or flute portions of siamese-type units and is also removed from the top surface of the block where not associated with split lines.

Two embodiments of the invention method and apparatus are disclosed. In one embodiment, the method and apparatus of the invention utilize flexible conduits which can be positioned to any of numerous air exit positions to accommodate to different styles and sizes of masonry units and differing locations of rows of core mark material. In another embodiment, the method and apparatus of the invention are based upon using substantially rigid air conduits but with an apparatus which allows the conduits to be positioned with a number of axes so as to accommodate to varying operating conditions as with the first embodiment.

DETAILED DESCRIPTION OF THE INVENTION

Figure 1:
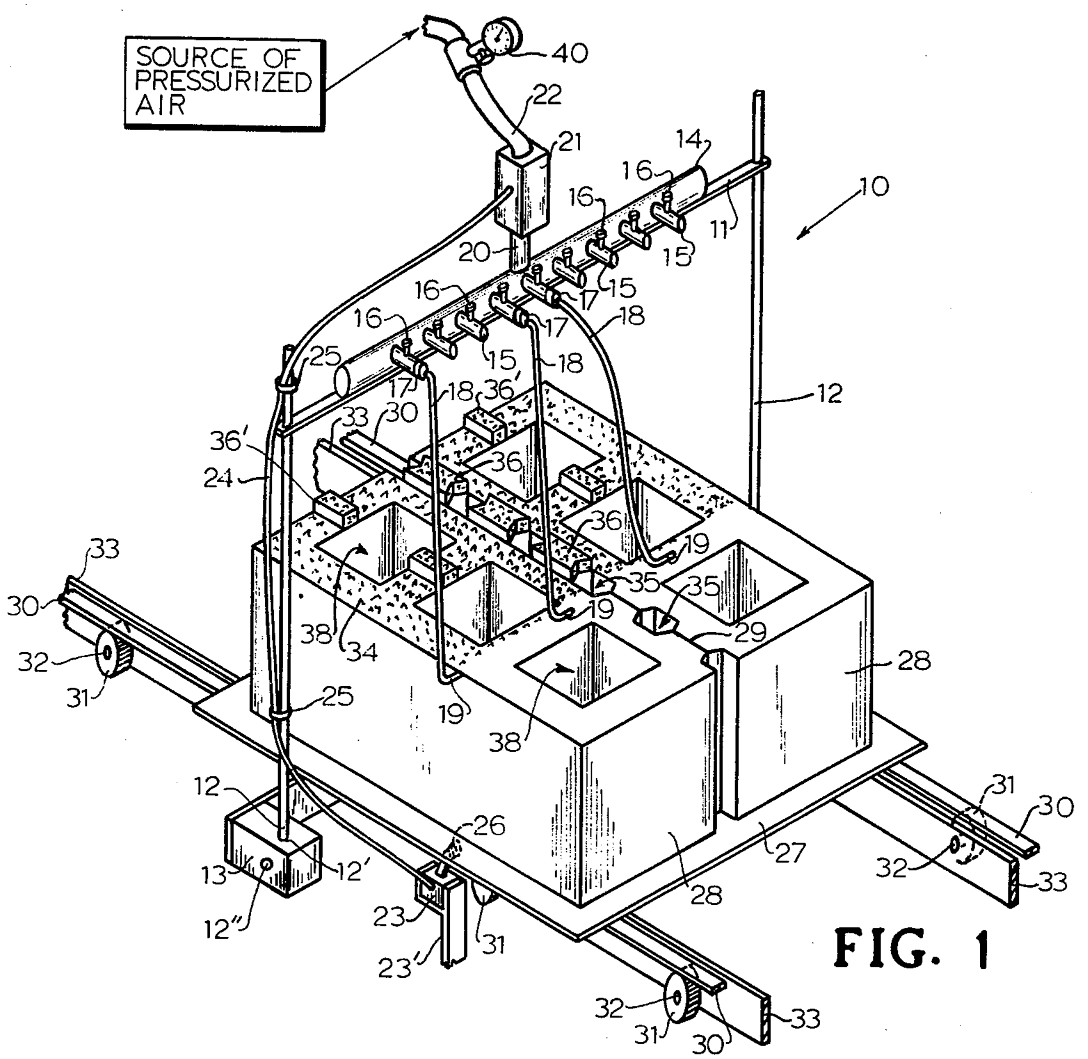
FIG. 1 is a perspective view illustrating removal of several rows of extraneous core mark material associated with a siamese-type masonry unit utilizing the apparatus and method of the present invention in a first embodiment.

Referring to FIG. 1, the apparatus of the present invention is illustrated as a removable attachment mounted above the conveyor area on the frame structure adjacent the location where freshly molded blocks are ejected from a conventional concrete block molding machine. The detachable core mark removing apparatus 10 is illustrated in FIG. 1 as being made up as an attachement and utilizes a support bar 11 and upright support rods 12, only one being shown, which are loosely supported in holes 12'. Rods 12 may rest on supporting set screws 12" at a single suitable fixed position. Alternatively, rods 12 may be held in various adjustable positions by means of set screws 12" engaging and holding rods 12 in holes 12'.

Manifold 14 is rigidly secured in place on support bar 11 by any suitable means, e.g., welding. Manifold 14 has outlet ports 15 and appropriate individual control valves 16 for each outlet port 15. Control valves 16 are adjustble so as to regulate the air pressure through ports 15. Quick disconnect couplings 17 are adapted for connection to outlet ports 15. As many outlet ports 15 and conduits 18 may be used as is needed simply by adding coupling 17 and conduits 18 to ports 15 and opening valves 16 to the desired air pressure. FIG. 1 illustrates the employment of three quick disconnect couplings 17 and associated conduits 18. Conduits 18 for purposes of the first embodiment are preferably flexible in nature and are capable of being curved manually to provide a wide range of adjustment in the direction and position of nozzles 19 of conduits 18 to accommodate to a wide range of styles and sizes of molded concrete block units and in turn to a range of spacings between rows of core mark material. The elevation, lateral position and angular direction of nozzles 19 are thus all adjustable through the curving technique. Manifold inlet 20 is integrally secured to manifold 14 and has a main solenoid control valve 21 secured thereto. Pressure control valve 40 allows the line pressure to solenoid valve 21 to be set and held at a suitable value.

Pressurized air supply line 22 supplies pressurized air from a pressurized air source through valve 40 to manifold 14 through solenoid valve 21 when activated by pressure applied to limit switch 23 connected to solenoid valve 21 by electrical line 24 held on one of rods 12 by straps 25. Limit switch 23 is preferably slidably and removably mounted in a retainer structure 23'. This allows the entire apparatus 10 of the invention to be quickly swung out of position simply by lifting rods 12 out of their support holes 12' and lifting switch 23 out of its retainer 23'. Switch 23 when appropriately located in retainer 23' is positioned to be tripped by the passing of each pallet of molded concrete blocks and, when tripped, energizes solenoid valve 21 and provides a supply of pressurized air to conduits 18 and nozzles 19. Switch 23 has a lever contact 26 which is depressed by each successive pallet 27 carrying a masonry unit and which in FIG. 1 is illustrated as a siamese molded unit having face shell portions 28 and a split line 29 along which the two halves of the masonry unit are intended to be fractured or split once cured in a kiln.

A conventional block molding machine typically receives the appropriate mixture of aggregate and cement in a semi-wet form, molds the mixture into the desired block form, vibrates the mixture for proper compaction of the material, ejects the molded, semi-wet block from the mold containing the undesirable core marks in one or more rows dependent on the nature of the masonry unit involved and deposits the masonry unit on pallet 27 for delivery to the kiln area by suitable means. The equipment with which the present invention cooperates utilizes a pair of conveyor belts 30 appropriately mounted on drive rollers 31. Drive rollers 31 are rotatably mounted on shafts 32 which are made integral with and project from frame members 33. Pallet 27 rests on and is propelled forward on conveyor belts 30 once the masonry unit is ejected from the molding machine. The leading edge of each successive pallet 27 contacts the lever contact 26 and holds switch 23 "on" as the pallet is moved forward. Closing of switch 23 energizes valve 21 and provides pressurized air to each of the nozzles 19 through conduits 18 for discharge at an elevation and at a lateral position and in an angular direction dependent on the curved position of the conduits 18 which in turn will depend on the particular height of masonry block unit involved as well as the particular width and style of unit from which the core marks are being removed. Also, in some instances, it is necessary that the conduits 18 be tilted so as to direct the air stream at an angle appropriate to the weight of the aggregate which forms the core mark. For example, a heavy weight aggregate may require different positioning of conduit 18 than does a lightweight aggregate and the method and apparatus of the invention readily adapts to this requirement as well as to the requirement to sometimes direct the pressurized air either forwardly or rearwardly along the line of the core mark. Since pallet 27 contacts the lever contact 26 prior to the masonry unit being operated on reaching the position of nozzles 19, the air flow is established in advance of the arrival of the masonry unit and therefore in advance of the arrival of the leading edge of the core marks to be removed with respect to the particular locations of the bank of nozzles 19. Once the nozzles 19 are positioned for a particular type of masonry unit, core mark removal operation becomes substantially repetitive and automatic since the pallets 27 are uniformly sized and the location of the masonry unit on each pallet 27 is generally the same as the successive pallets 27 move along on the conveyor belts 30.

FIG. 1 illustrates one core mark 36 along the split line 29 and associated with formation of the relatively small core holes 35. Other rows of core marks 36' are illustrated as being disposed on either side of core mark 36 and centered on the large core holes 38 along surfaces which are not intended to be split. Minor quantities of extraneous molding material 34 may also be left on the top surface of the masonry unit as it is ejected from the molding machine. It is, of course, important that the rows of core mark material 36 and 36' be removed and such removal is especially critical along the split line 29 and in the area of the relatively small core holes 35 associated with rib or flute portions of siamese-type masonry units such as illustrated in FIG. 1. As previously noted, the orientation of the masonry unit on the pallet 27 and the size of pallet 27 are both generally uniform. Therefore, the split or fracture line 29 tends to orient in a consistent position and direction on each successive pallet 27.

Figure 2:
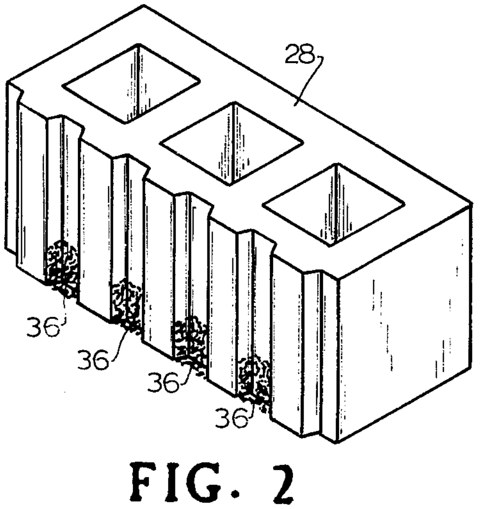
FIG. 2 is a perspective view of a split siamese molded block illustrating how extraneous core mark material is brushed into the core holes by conventional cleaning and which is required to be removed after being cure hardened.

Mention has already been made concerning the current practices of removing rows of core mark material by using either a roller brush positioned across the path of the masonry unit as it emerges from the molding machine or by use of a tensioned wire in the manner previously described. With either prior art method however, it has been found that substantial portions of a row of core mark material such as the illustrated core mark row 36 will be brushed or otherwise forced into the small core holes 35 along the split line 29. Such material typically falls to the bottom of the holes 35 where it rests on pallet 27 and during the curing process such material will harden and adhere to the masonry unit within the particular hole 35. Once the masonry unit is split into two halves, the hardened material is exposed and is unsightly in the recesses of the masonry unit as seen in FIG. 2. According to prior art practices, such hardened material in the holes 35 could either be scraped before splitting the masonry unit or could be scraped from the ribs or flutes 37 after splitting and prior to shipment or on the job site once the blocks are laid. In any case, substantial labor has been involved in removing such hardened excess core mark material from the ribs or flutes 37 and when left is unpleasing to the sight and is often required to be removed by the owner or architect. It has also been mentioned that if a core mark such as the core mark row 36 illustrated in FIG. 1 is not removed before being cured and before splitting, the core mark material will tend to divert the top splitting blade from its proper path of movement so as to prevent the obtaining of a center split of the masonry unit involved.

Figure 3:
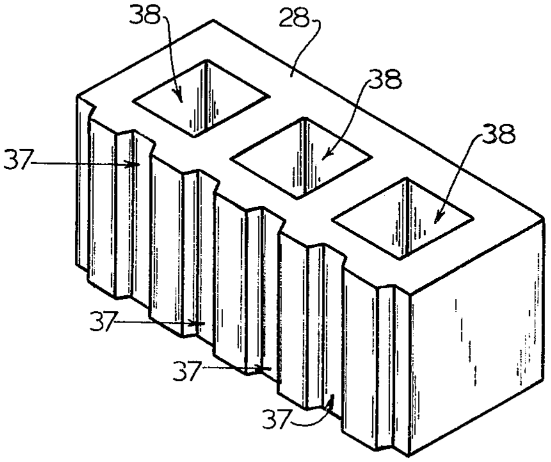
FIG. 3 is perspective view of the FIG. 2 rib block after curing and after excess material has been blown therefrom by the apparatus and method of the invention.

The core mark removing apparatus 10 of the invention removes rows of core mark material prior to the curing process and from block surfaces having split lines as well as from block surfaces which are not intended to be split as with conventional masonry block units. Removal of the excess material is accomplished by the pressurized air from nozzles 19. Once valve 21 is energized by activating switch 23, pressurized air emerges from nozzles 19. Since conduits 18 are flexible in nature they can be curved so that the most advantageous air pattern is established which allows the loose excess material to be blown clear of the tops of the masonry unit being operated on so as to not fall down into the ribs or flutes 37 referred to in FIG. 3. Once the blocks are split utilizing the method and apparatus of the invention, a clean rib or flute appearance is left as illustrated in FIG. 3.

As previously mentioned, prior art methods and apparatus have effectively dealt with removing of core marks from conventional masonry units which are not intended to be split either by using the brush technique or the tensioned wire technique as previously described. However, because of the quantities and various styles of masonry units involved, a molding machine in a block molding plant is normally required to make both conventional masonry units as well as siamese-type masonry units which are to be split. An important aspect of the method and apparatus of the invention is that core marks left on both types of blocks can be removed with the apparatus and according to the method of the invention.

The invention is of special importance with regard to removing core marks from molded siamese masonry units which are to be split for decorative appearance and especially with regard to such siamese masonry units which have very small rib or flute portions. Siamese masonry units having extremely large rib or flute portions generally do not present as serious a problem with respect to removal of core marks on the split line since any excess core mark material which falls into a large hole may not contact and harden on a rib or flute surface as illustrated in FIG. 2, for example. The problem is also less serious when removing rows of core marks such as the illustrated core marks 36′ which are centered on the large molded cavities 38 of the masonry units shown in FIG. 1. Nevertheless, it is most desirable to remove all core mark material from both the conventional-type masonry unit as well as the siamese-type masonry unit and irrespective of the size of the core holes. In general, when either the width or length of any core hole 35 along the split line on which the block is split is less than two inches and especially when less than one inch, the invention finds useful application. Since the orientation of the split line 29 of one block on its board or pallet 27 tends to be the same as the orientation of the split line 29 on the next block on its pallet board 27, the flexible conduits 18 with their respective nozzles 19 once set can be used to effectively blow away the core mark material along the split line 29 as well as the other core mark material such as in core mark rows 36′, indicated in FIG. 1, of each successive block without requiring the conduits and their respective nozzles to be readjusted. However, when a different style of block is molded, adjustments can be readily made.

In the alternative embodiment illustrated in FIGS. 4–9, apparatus 50, support rods 12 and switch 23 are detachably mounted as previously described with respect to the first embodiment. Thus, apparatus 50 of the alternative embodiment may be lifted out of position when so required for maintenance, cleanup operations, and the like.

Figure 4:
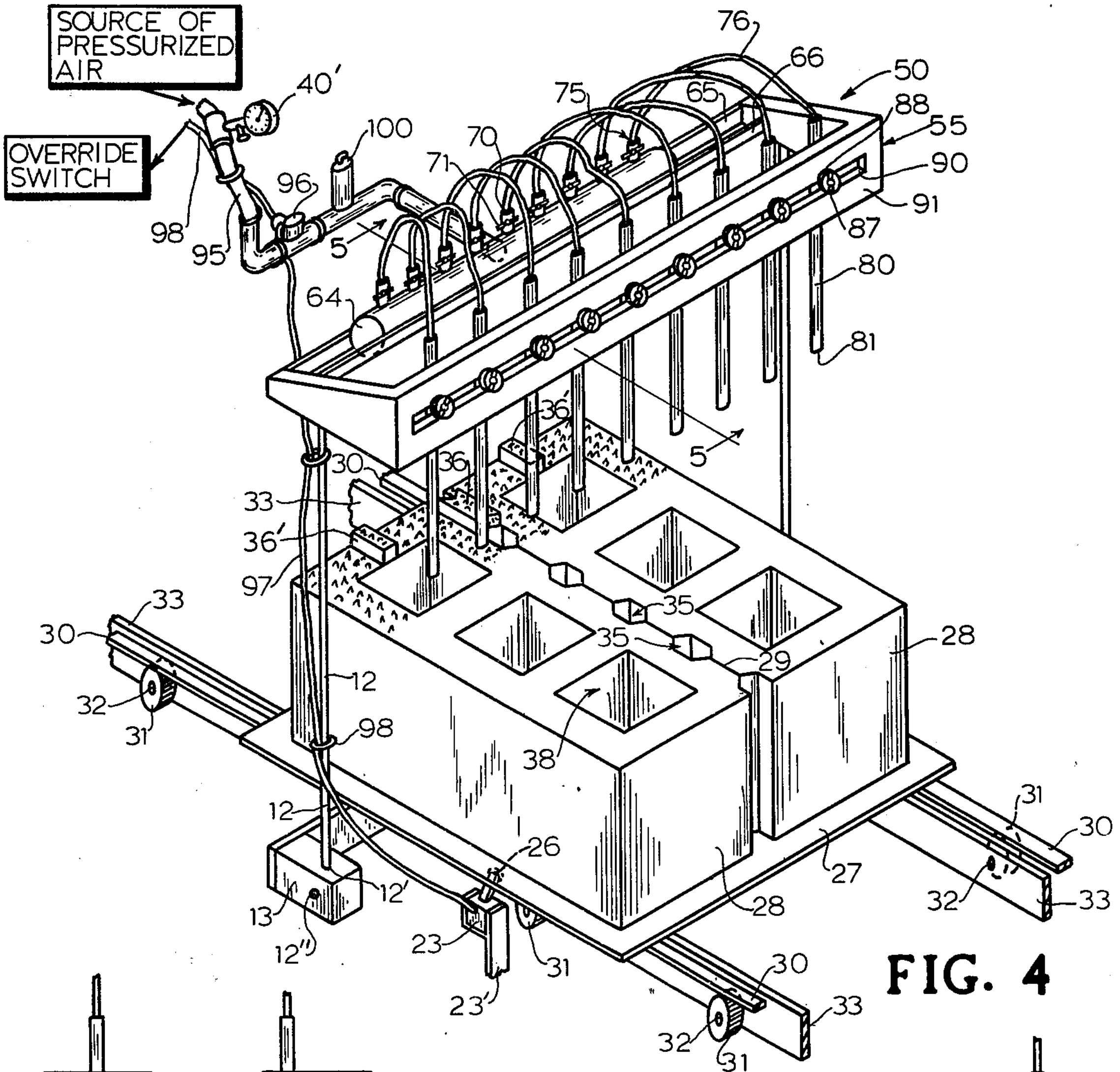
FIG. 4 is a perspective view illustrating the apparatus and method of the second embodiment of the invention.
Figure 9:
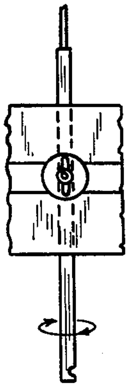
FIGS. 6–9 are various fragmentary views illustrating various air discharge orientations which may be assumed by any of the air conduits illustrated in FIG. 4 on various axes.
Figure 8:
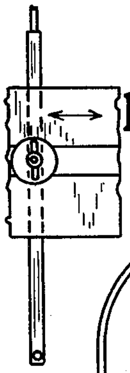
Figure 5:
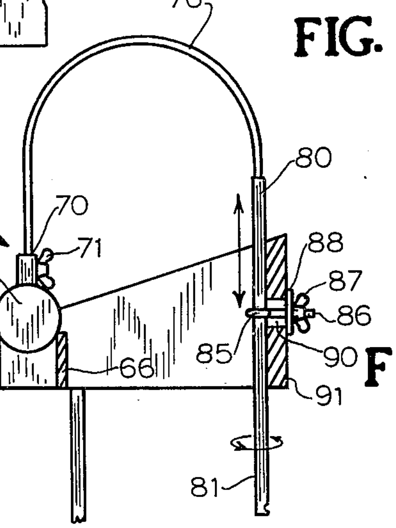
FIG. 5 is a section view taken on line 5—5 of FIG. 4.
Figure 6:
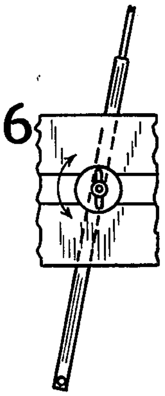
Figure 7:
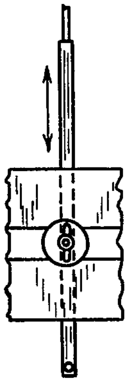

With particular reference to FIGS. 4 and 5, support frame 55 is secured to support rods 12 by any suitable means such as by welding, bolts or the like. Manifold 64 rests on support frame bars 65, 66 and, like manifold 14 of FIG. 1, has outlet ports 70 and appropriate individual adjustable controls valves 71 for each outlet port 70. Quick disconnect couplings 75 connect one end of the flexible conduits 76 to the outlet ports 70 and at the opposite end, conduits 76 connect to a comparable number of rigid air blast tubes 80 having respective air discharge ports 81. As best seen in FIGS. 6–9, each respective air blast tube 80 can be adjusted either up or down in directions parallel to the axis of the tube as illustrated in FIGS. 5 and 7, rotatively around a horizontal axis perpendicular to the tube axis as illustrated in FIG. 6, laterally as illustrated in FIG. 8 or rotatively around its own axis as illustrated in FIGS. 5 and 9. The number of outlet ports 70, conduits 76 and air blast tubes 80 which are used are selected according to the particular style block being manufactured. FIG. 4, for example, illustrates employment of nine connected flexible conduits 76 and a comparable number of air blast tubes 80.

Each air blast tube 80 is held in position by a hook member 85 which engages the respective air blast tube 80 and is secured by a wing nut 87 mounted on a threaded portion 86 of hook member 85 and utilizing a washer 88. Thus, by utilizing this fastening arrangement and by means of the slot 90 formed in the front frame member 91, the various air blast tubes 80 may be adjusted so that the respective air discharged from their respective exit ports 81 may be directed either forwardly or rearwardly along a particular core mark, in a level or tilted direction, in various angular relations with respect to the direction of the core mark and from various lateral and vertical positions as required by loosening and tightening the respective wing nuts 87 and moving the respective hook members 85 laterally as required and the various air blasts members up or down, rotatively around their own axis or rotatively through the axis of the respective hook members 85 as further illustrated in FIGS. 5–9. From a practical viewpoint, this arrangement thus means that essentially any style of masonry unit as is typically encountered in concrete block construction may be dealt with from the viewpoint of removing any core marks associated with the molding of the same.

With continued reference to FIGS. 4 and 5, a pressurized air supply line 95 supplies pressurized air from a pressurized air source to manifold 64 through control valve 96 when activated by operating switch 23 connected to valve 96 by electrical line 97 held on one of rods 12 by straps 98. Provision is also made for operating valve 96 by a separate electrical line 98 suitably connected to an override switch. In this embodiment, provision is also made for excess pressure by providing a pressure relief valve 100 connected to the flexible supply line 95. While the use of an override switch and pressure relief valve is not illustrated in FIG. 1, the same could be incorporated with the apparatus of FIG. 1.

From the explanation already given, it will be understood that when the lever contact 26 on limit switch 23 is depressed by each successive pallet 27 in the manner previously explained, a blast of air will be admitted by each of the air blast tubes 80 through their respective exit ports 81 and with sufficient volume and force to prevent the accumulation of excess material in the manner illustrated in FIG. 2 in the case of a siamese-type masonry unit and so as to leave such masonry unit, when split, essentially in the condition illustrated in FIG. 3. Again, it should be recognized that while the invention apparatus and method are of unique importance to removing core marks from siamese-type masonry units, the apparatus and method of the invention are equally useful in removing core marks from conventional-type blocks. The ability to remove core marks from both types of masonry units, that is, both the type of masonry unit which is split as well as the type of masonry unit which is not split is, of course, a unique and important advantage of the invention.

As with the apparatus of the first embodiment, it will also be appreciated that the entire apparatus 50 may be readily lifted out of position for cleaning, maintenance, routine upkeep operation, and the like. Also, as new styles of blocks are being made, the relative positions of the air blast tubes 80 and their respective nozzles 81 can be adjusted to accommodate to the particular style block being manufactured and to the particular array of core marks so as to minimize the type of problem illustrated in FIG. 2. While normally intended to be used for removing all of the core marks present on a particular masonry unit, it is recognized that in some applications only one core mark needs to be removed such, for example, as a conventional block or only a core mark along a split line is of concern. Thus, the invention apparatus and method adapt to removing either plural or single core marks as the operation may require.

While typically plural rows of core marks will be removed simultaneously, it is recognized that where a large volume of conventional blocks are being made only one air blast tube 80 may be required. In such case the header or manifold 64 may not be required since conduit 76 could be connected to valve 96. In either case pressure control valve 40 (FIG. 1) or 40' (FIG. 4) may be employed.

What is claimed is:

1. In the repetitive formation of concrete block machine molded of a semi-wet mixture of aggregate and cement utilizing a selected number of core bars to form with each core bar plural spaced-apart vertical core holes centered on a core bar line extending the length of the block, a method for removing excess core mark material left on the block's top surface along each such line and adjacent the core holes associated therewith after the block has been ejected from the molding machine and before the block has been cured to avoid such excess core mark material remaining on the surface of the block and in the case of core holes being along a split line from falling into and hardening in such split line core holes, said method comprising:

(a) receiving each freshly molded block from the molding machine as each is successively ejected therefrom and depositing the block at a first station on a uniform size pallet board and positioned so as to orient each line of excess core material on the top surface of each successive block in a specific relation to the pallet board and repeating such positioning from block to block in a substantially uniform repetitive orientation;

(b) conveying each said pallet board and each said molded block positioned thereon through a second station and along a predetermined path and length of travel which repeats itself from pallet board to pallet board;

(c) bringing a selected portion of each said pallet board in continuous physical contact with the actuating portion of a normally open pressure actuated electrical switch fixedly stationed in the path of said pallet board travel through said second station to cause said switch to be closed for the time interval corresponding to said length of travel and to be open when not in such physical contact with a said pallet board;

(d) passing each said block and pallet board while traveling through said second station and while said switch is closed below an air supply system associated with said machine and having:

(i) an electrically actuated valve operatively associated with said switch and having an air inlet connected to a source of pressurized air and an air outlet for discharging such pressurized air while said switch is closed during travel of each said pallet through said second station; and (ii) for each said line of core mark material at least one positionable conduit communicating at one end to the said valve discharge outlet and having at an opposite end an air discharge port; and (e) while each said block and pallet board passes through said second station locating and fixing each said positionable conduit such that the air discharge port associated therewith is at an appropriate elevation, lateral position and angularly directed with respect to a selected said line of excess core material so as to continuously direct pressurized air from each respective said air discharge port toward a selected line of core mark material on the top surface of said block during the course of the block's travel through said second station while said switch is closed and said valve is open in a manner such that substantially all excess core material is blown clear of the top surface of said block and prevented from falling and hardening in any of such core holes associated with a split line.

2. The method of claim 1 wherein said core bars include at least one core bar forming relatively small core holes along a split line and at least one other core bar which forms substantially larger core holes along a line not intended to be split and wherein during the course of the block's travel through said second station at least some of the said excess core material is blown into the said large core holes but without blowing substantially any of such excess core material into said relatively small core holes.

3. The method of claim 1 wherein said positionable conduits incorporated in said air supply system comprise substantially rigid conduits and including the step of adjusting each such conduit rotatively around its central axis, vertically along said axis, rotatively around a horizontal axis passing through and perpendicular to the conduit axis and laterally to obtain the position of each respective air discharge port associated therewith.

4. The method of claim 1 wherein each said positionable conduit comprises a conduit which can be bent into shape and including the step of bending each of said conduits to locate the position of the respective air discharge port associated therewith prior to passing each said block through said second station.

5. An apparatus capable of being mounted on and used in conjunction with a conventional concrete block molding machine during repetitive formation of concrete blocks molded of a semi-wet mixture of aggregate and cement utilizing a selected number of core bars to form with each core bar plural spaced-apart vertical core holes centered on a core bar line extending the length of the block and with such apparatus being adapted for removing excess core mark material left on the block's top surface along each such line after the block has been ejected from the molding machine and before the block has been cured to avoid such excess core mark material remaining on the surface of the block and in the case of core holes being along a split line from falling into and hardening in such split line core holes, said apparatus comprising:

(a) a conveyor integral with said block molding machine for receiving with each molded and ejected block a pallet board upon which the block is carried from said molding machine while said block is transferred on said conveyor away from said machine;

(b) support means mounted above and extending across the path of said conveyor;

(c) air supply means mounted on said support means above the path of said conveyor and having an electrically actuated valve with an air inlet connected to a source of pressurized air and an air outlet for discharging such pressurized air;

(d) for each said line of core mark material at least one positionable conduit communicating at one end to the said valve discharge outlet and having at an opposite end an air discharge port located proximate the path of travel of the line of core mark material with which the respective conduit having such air discharge port is associated, such air discharge port being in elevation, laterally and with a direction and angular discharge adapted to blow core mark material passing such air discharge port from the top surface of said block such that once a complete line of such core mark material has passed such air discharge port it will have been blown off such top surface and in the case of core mark material associated with the split line will have been directed away from core holes associated therewith; and (e) pressure actuated switch means for activating said electrical valve and providing the supply of pressurized air to said valve air outlet, said switch means being positioned so that as each said block loaded pallet board passes along the path of said conveyor, said switch means is contacted by said pallet board and initiates the activation of said valve and effects delivery of said pressurized air to each said conduit and air discharge port associated therewith enabling said pressurized air to be directed onto the top surface of each successive said block and in a manner effective to blow each said line of core mark material off the top surface of said block on which such core mark material appears and in the case of core mark material along a split line blowing such split line of core mark material in a manner adapted to prevent any substantial amount of material associated therewith from entering any core hole associated with such split line, said switch means upon passage of said loaded pallet board past said switch being arranged to open and effectively cause a shut-off of said valve and thereby shut-off of said supply of pressurized air.

6. The apparatus of claim 5 wherein each said conduit is in the form of a bendable conduit which can be shaped by the operator to independently establish each conduit air discharge port location for maximizing the efficiency of removal of said core mark material.

7. The apparatus of claim 5 wherein each said conduit having a said air discharge port is substantially rigid and including means for mounting a plurality of such conduits in association with said air supply means and with securing means enabling each such conduit to be rotated around its central axis, vertically along its central axis, rotatively around an axis perpendicular to such conduit central axis and laterally along the means supporting such plurality of conduits whereby each such air discharge port can be independently located for maximizing the effeciency of removing plural lines of said core mark material.

8. The apparatus of claim 5 wherein said support means extending across said conveyor, said air supply means, said conduits and said switch means are arranged in the nature of a detachable assembly.

9. The apparatus of claim 5 wherein said air supply means includes an air manifold connected to said valve air outlet such that said manifold may be pressurized when said valve is open and including a plurality of said conduits detachably coupled to said manifold.

10. An apparatus as claimed in claim 5 wherein said concrete block molding machine includes at least one core bar arranged to form relatively small core holes along a split line and at least one other core bar arranged to form substantially larger core holes along a line not intended to be split and including at least one said conduit having its said discharge port oriented to remove core mark material along the split line while preventing any substantial amount of core mark material along such split line from entering any of said relatively small core holes and at least one other conduit having its discharge port oriented to remove the core mark material from the line not intended to be split and in a manner in which at least a portion of the removed material enters at least some of said larger holes but without any substantial amount entering any of said relatively small holes.

11. An apparatus adapted for use in conjunction with a conventional concrete block molding machine during repetitive formation of either splittable or non-splittable concrete blocks molded of a semi-wet mixture of aggregate and cement the composition of which varies according to the type block being molded, said machine utilizing a selected number of core bars to form with each core bar plural spaced-apart vertical core holes centered on a core bar line extending the length of the block and with such core holes being relatively small in size when associated with a split line and substantially larger in size when not so associated, said apparatus being adapted for removing core mark material left on the block's top surface along each such line after the block has been ejected from the molding machine and before the block has been cured to avoid such core mark material remaining on the top surface of the block or being deposited in any substantial amount in any of said relatively small core holes associated with a split line, said apparatus comprising:

(a) a conveyor for receiving each freshly molded block from the molding machine at a first station at which the block is deposited on a uniform size pallet board and positioned so as to orient each line of core material on the top surface of each successive block in a specific relation to the pallet board with such positioning from block to block being repeated in a substantially uniform repetitive orientation and with the conveyor extending through a second station through which the pallet and block are transferred;

(b) support means detachably mounted and extending above and across the path of said conveyor;

(c) manifold means mounted on said support means and having an air inlet for receiving pressurized air and plural spaced-apart outlets for discharge of said pressurized air;

(d) a pressurized air source means;

(e) a normally closed electrical valve associated with said air source means and manifold inlet for controlling entry of pressurized air thereto;

(f) a plurality of distribution conduits supported on said support means, each said conduit terminating in a discharge end having an air discharge port, each said conduit discharge end being positionable such that the air discharge port associated therewith is at an appropriate elevation, lateral position and angularly directed with respect to a selected said line of core material such that pressurized air from each respective said air discharge port may be continuously directed toward a selected line of core mark material on the top surface of said block during the course of the block's travel through said second station; and (g) pressure actuated switch means for activating said electrical valve and providing the supply of pressurized air to said manifold, said switch means being positioned so that as each block loaded pallet board passes along the path of said conveyor through said second station, said switch means is contacted by said pallet board and initiates the activation of said electrical valve and effects delivery of said pressurized air to said conduits thereby enabling said pressurized air to be directed through said air discharge ports and to the top surface of each successive said block and in a manner effective to blow said core mark material from each line of core mark material on the surface of said block in a manner allowing such core mark material to be blown into any said large core hole while preventing any substantial amount of such core mark material being blown into any relatively small core holes, said switch means upon passage of each said successive loaded pallet board beyond said switch means, being arranged to open and effectively cause a shut-off of said pressurized air such that a flow of said pressurized air is established through said conduit air discharge ports prior to passage of each successive block past such air dicharge ports while maintaining such flow of pressurized air established as each said successive block moves through said second station.

12. An apparatus as claimed in claim 11 wherein said conduit discharge ends comprise substantially rigid conduits and fastening means on said support means for such rigid conduits enabling each such rigid conduit to be adjusted rotatively around and along its central axis, rotatively around a horizontal axis passing through and perpendicular to the conduit axis and laterally to obtain the position of each respective air discharge port associated therewith.

* * * * *